Feb. 13, 1968  YUSHIRO YASUI  3,368,322
BAG SEALING MACHINE FOR CLOSING BAGS AND CASINGS OF
FLEXIBLE MATERIALS AND A METHOD OF SEALING THE
OTHERWISE OPEN ENDS OF SUCH BAGS AND CASINGS
Filed July 23, 1965  8 Sheets-Sheet 1

INVENTOR.
BY Yushiro Yasui

Feb. 13, 1968    YUSHIRO YASUI    3,368,322
BAG SEALING MACHINE FOR CLOSING BAGS AND CASINGS OF
FLEXIBLE MATERIALS AND A METHOD OF SEALING THE
OTHERWISE OPEN ENDS OF SUCH BAGS AND CASINGS
Filed July 23, 1965    8 Sheets-Sheet 2

INVENTOR
BY *Yushiro Yasui*

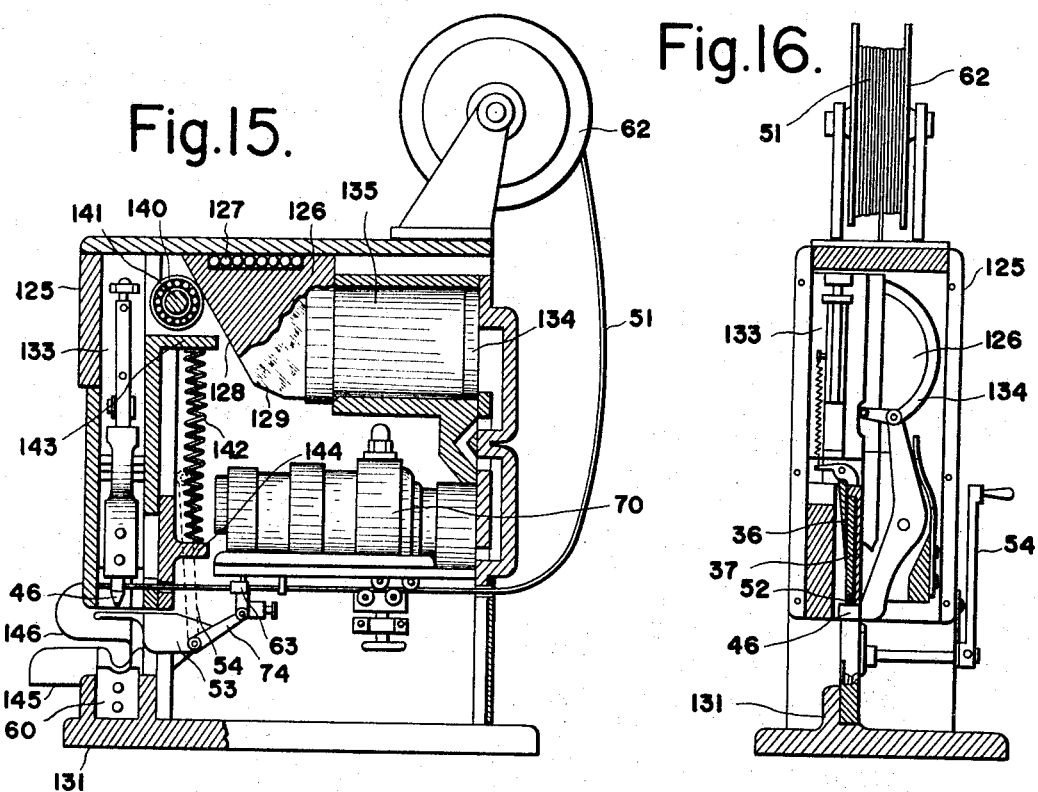
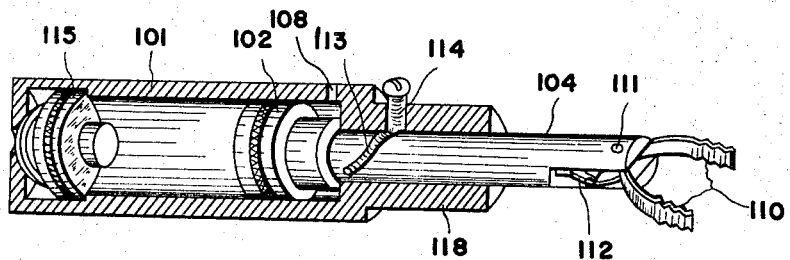

Feb. 13, 1968  YUSHIRO YASUI  3,368,322
BAG SEALING MACHINE FOR CLOSING BAGS AND CASINGS OF
FLEXIBLE MATERIALS AND A METHOD OF SEALING THE
OTHERWISE OPEN ENDS OF SUCH BAGS AND CASINGS
Filed July 23, 1965  8 Sheets-Sheet 6

INVENTOR.
Yushiro Yasui
BY

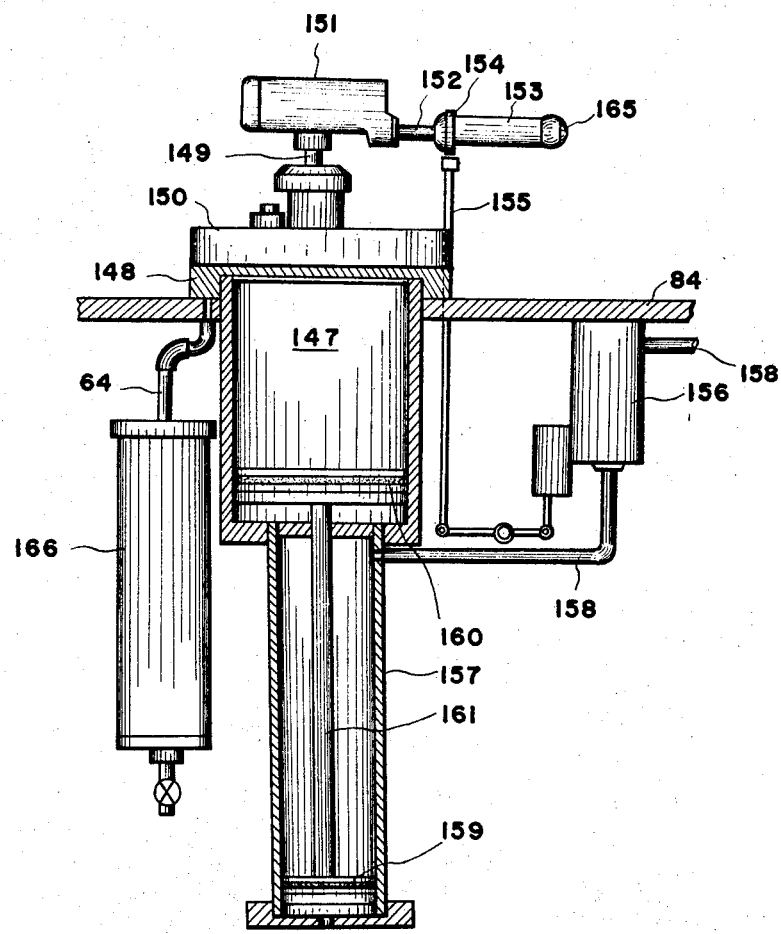

United States Patent Office 3,368,322
Patented Feb. 13, 1968

3,368,322
BAG SEALING MACHINE FOR CLOSING BAGS
AND CASINGS OF FLEXIBLE MATERIALS
AND A METHOD OF SEALING THE OTHER-
WISE OPEN ENDS OF SUCH BAGS AND
CASINGS
Yushiro Yasui, 30 Higashi-Aoyagi-cho,
Bunkyo-ku, Tokyo, Japan
Filed July 23, 1965, Ser. No. 474,335
11 Claims. (Cl. 53—138)

ABSTRACT OF THE DISCLOSURE

A bag sealing machine comprising a metal wire supplying means, a metal fastener forming means, and a metal fastener applying means, the metal wire supplying means supplies a length of metal wire into a metal wire shearing station through a perforation and the metal fastener forming means comprises a body, a shearing member, a slidable die positioned between two legs of the shearing member, and a forming core. The shearing member is slidable on the body and the slidable die is slidable on the shearing member. The forming core is swingable on the body. The metal wire is cut off into a length for a fastener blank by the lowering action of the one of the two legs cooperating with the inner end of the perforation and the fastener blank is deformed into an inverted U-shaped fastener in a metal fastener forming station by the lowering action of the two legs of the shearing member cooperating with the forming core conditional on that the legs of the shearing member continue the lowering, the forming core stays temporarily between the two legs and under the fastener blank and is retracted just after the invertedly U-shaped fastener has been formed, and the slidable die follows the two legs of the shearing member after the forming core has been retracted. The metal fastener applying means comprises the shearing means, the slidable die, a fixed anvil positioned just under the slidable die, a swingable forcing member and guides. The shearing member continues the lowering holding the inverted U-shaped fastener into a bag fastening station. The slidable die follows the two legs of the shearing member with a time delay and continues lowering after the legs of the shearing member have arrived at the fixed anvil. The forcing member is adapted to place a gathered neck of a bag on the fixed anvil. The guides are adapted to guide the legs of the shearing member in the bag fastening station. The inverted U-shaped fastener is put on the gathered neck by the lowering action of the slidable die and further deformed into a coil having more than one turn around the neck by the lowering action of the slidable die cooperating with the legs of the shearing member and the fixed anvil. A neck gathering means, a neck twisting means, and a bag evacuation means may also be provided.

This invention relates to a bag sealing machine for closing bags and casings of flexible materials and a method of sealing the otherwise open ends of such bags and casings.

It is well known that such a foodstuff as sausage is packed by a film casing or a bag of such an artificial flexible material as hydrochloric acid rubber or vinylidene chloride and the bag is evacuated prior to the sealing operation, the open end of the bag is gathered and twisted, and a fastener is applied to the gathered end of the bag.

One object of this invention is to provide a bag sealing machine which automatically provides a fastener and applies it to an open end or neck of a bag and a film casing without damaging such a relatively fragile article as the bag and a film casing.

Another object of this invention is to provide a bag sealing machine which is operable quietly and noiselessly.

Still another object of this invention is to provide a bag sealing machine which is effective and reliable in performance for long periods of time and provides an inexpensive fastener.

Further, another object of this invention is to provide a bag sealing machine which automatically gathers a neck of a bag prior to the application of a fastener thereto.

A still further object of this invention is to provide a bag sealing machine which automatically twists a neck of a bag prior to the application of a fastener thereto.

A still further object of this invention is to provide a bag sealing machine which automatically evacuates a bag prior to the application of a fastener thereto.

It is also an object of this invention to provide a method of sealing an open end of a bag substantially automatically, the method being realized by the bag sealing machine in accordance with this invention having the above features which are considered features of the method.

Briefly stated in accordance with one aspect of this invention, there is provided a bag sealing machine comprising a metal wire supplying means, a metal fastener forming means, and a metal fastener applying means. The metal wire supplying means supplies a length of metal wire into a metal wire shearing station through a perforation. The metal fastener forming means comprises a body, a shearing member, a slidable die positioned between two legs of the shearing member, and a forming core. The shearing member is slidable on the body. The slidable die is slidable on the shearing member. The forming core is swingable on the body. The perforation is provided through a wall of the body with which one of the two legs of the shearing member is adapted to cooperate. The metal wire is cut off into a length for a fastener blank by the lowering action of the one of the two legs cooperating with the inner end of the perforation. The fastener blank is deformed into an inverted U-shaped fastener in a metal fastener forming station by the lowering action of the two legs of the shearing member cooperating with the forming core conditional on that the legs of the shearing member continue the lowering, the forming core stays temporarily between the two legs and under the fastener blank and is retracted just after the invertedly U-shaped fastener has been formed, and the slidable die follows the two legs of the shearing member after the forming core has been retracted. The metal fastener applying means comprises the shearing means, the slidable die, a fixed anvil positioned just under the slidable die, a swingable forcing member and guides. The shearing member continues the lowering holding the inverted U-shaped fastener into a bag fastening station. The slidable die follows the two legs of the shearing member with a time delay and continues lowering after the legs of the shearing member have arrived at the fixed anvil. The forcing member is adapted to place a gathered neck of a bag on the fixed anvil. The guides are adapted to guide the legs of the shearing member in the bag fastening station. The inverted U-shaped fastener is put on the gathered neck by the lowering action of the slidable die and further deformed into a coil having more than one turn around the neck by the lowering action of the slidable die cooperating with the legs of the shearing member and the fixed anvil.

The bag sealing machine in accordance with this invention may further comprise a neck gathering means, a neck twisting means, and a bag evacuation means.

The invention will be better understood and other objects and additional advantages of the invention will become apparent upon perusal of the following description taken in connection with the drawings, and the scope of the invention will be defined in the appended claims.

In the drawings: FIG. 1 is a side elevational view of an embodiment of this invention shown partly in section, and partly broken away;

Figure 10:
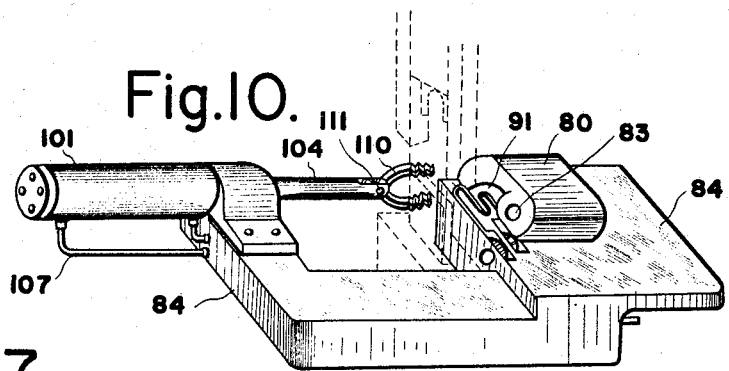
Figure 17:
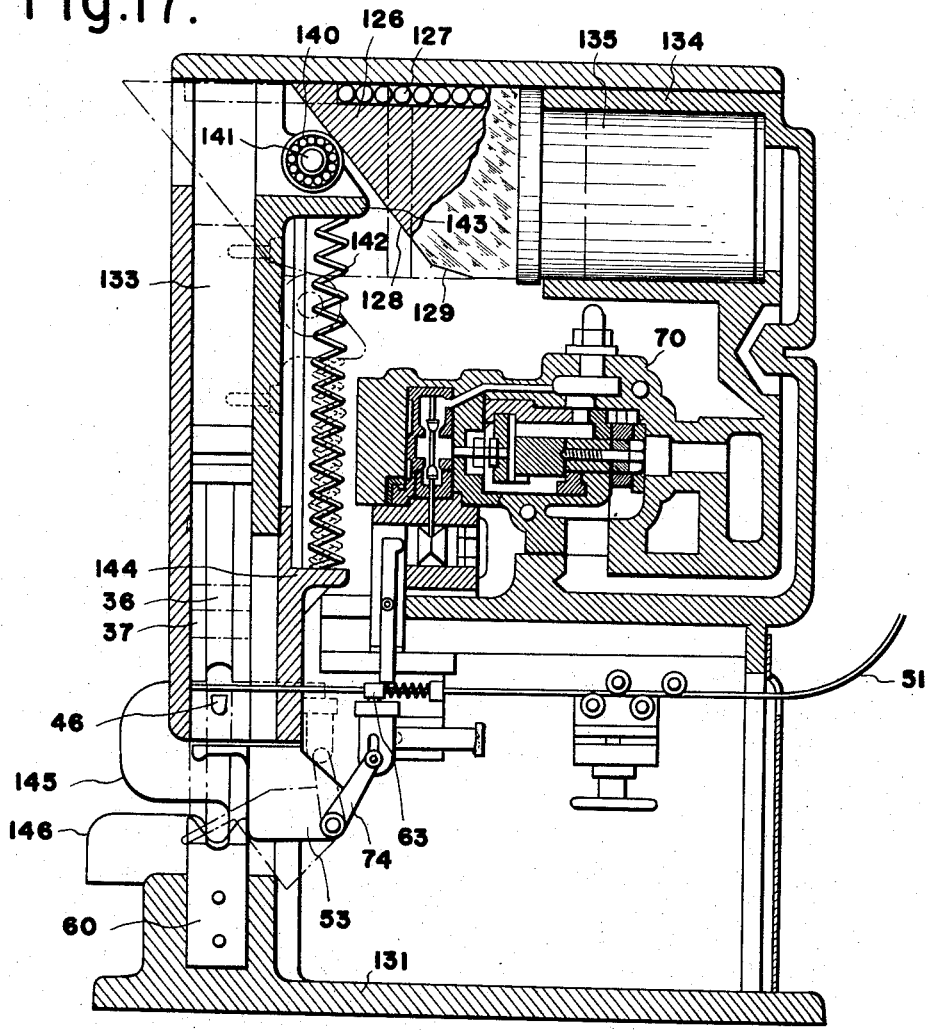
Figure 12:
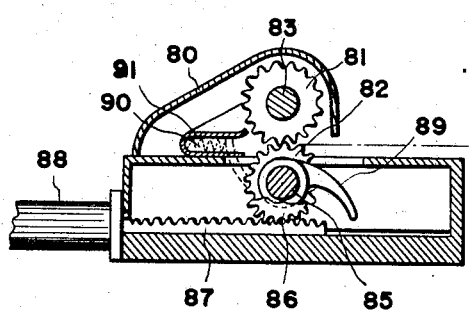
Figure 11:
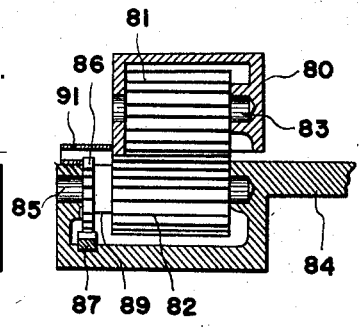
Figure 18:
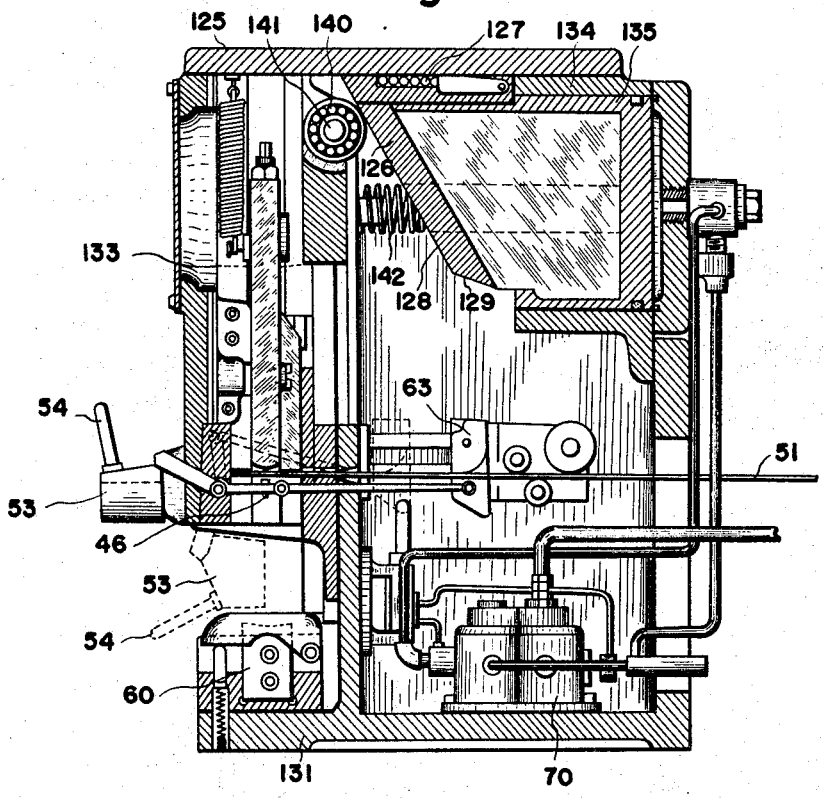
Figure 19:
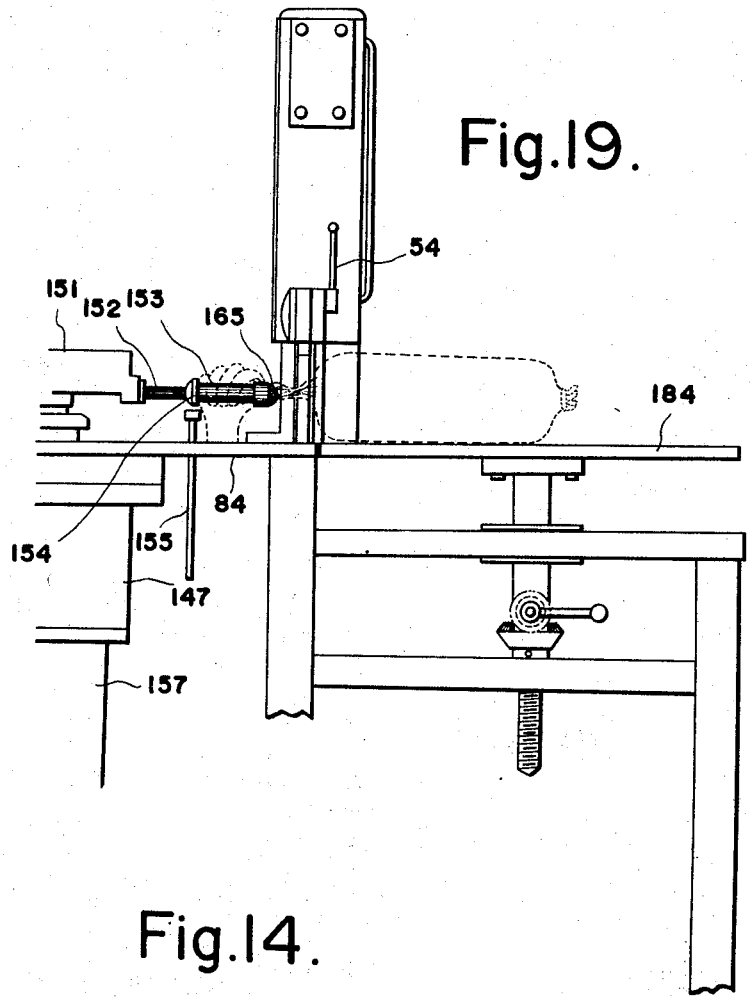
Figure 14:
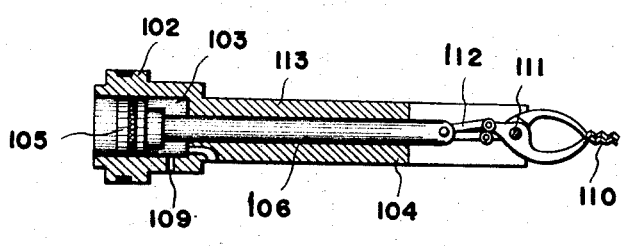
Figure 21:
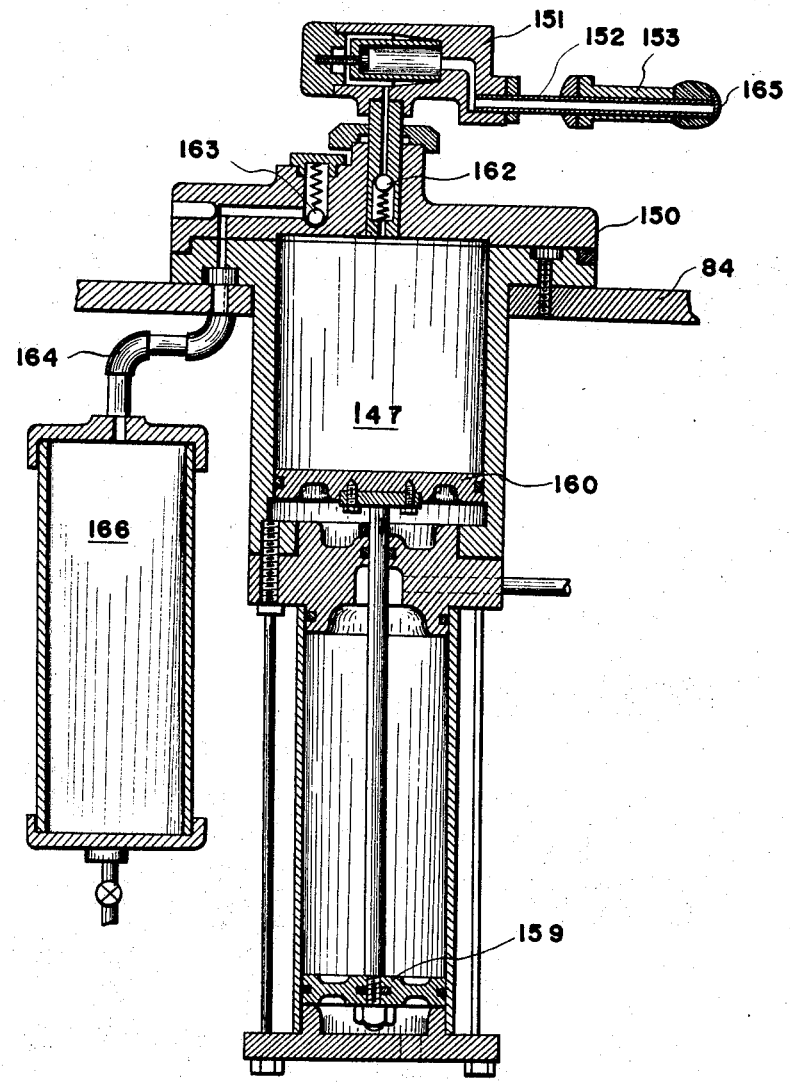

FIGS. 5, 6, 7, 8, and 9 show the successive process of deforming a fastener;

FIG. 10 is a perspective view of a bag neck gathering means and a bag neck twisting means which may be provided in the bag sealing machine in accordance with this invention;

FIG. 11 is an enlarged sectional front view of the bag neck gathering means of FIG. 10;

FIG. 12 is an enlarged vertical central sectional side view of the gathering means of FIG. 11;

FIG. 13 is an enlarged perspective view of a bag neck twisting means shown partly in section;

FIG. 14 is a fragmentary longitudinal sectional view, a part of the twisting means of FIG. 11;

FIG. 15 is a side elevational view of an alternative embodiment of this invention shown partly in section, and partly in elevation;

FIG. 16 is a front view of the embodiment of FIG. 15 partly in section and partly in elevation;

FIG. 17 is an enlarged view similar to FIG. 15 but with additional parts in section;

FIG. 18 is a side elevational view of still another bag sealing machine embodying this invention shown partly in section, and partly in elevation;

FIG. 19 is a front view of a bag sealing machine in accordance with this invention provided with a bag evacuation means shown partly broken away;

FIG. 20 is an enlarged front view of the bag evacuation means shown partly in section, and partly in elevation; and FIG. 21 is a greatly enlarged front view of the bag evacuation means of FIG. 20.

Figure 2:
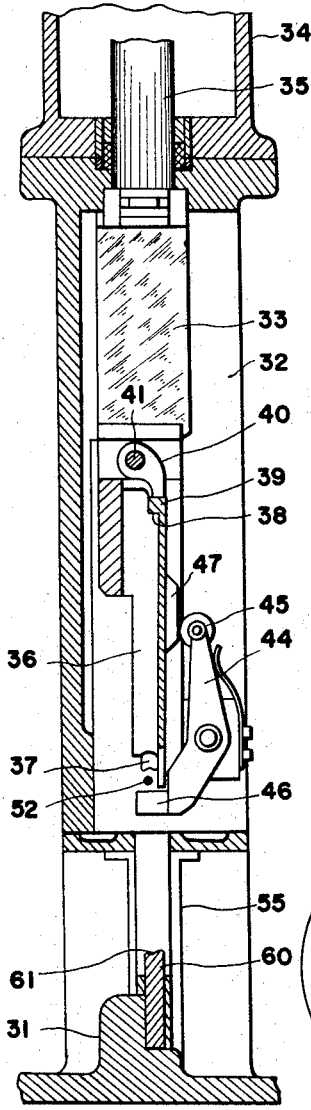
FIG. 2 is an enlarged front elevational view thereof for illustrating the metal wire shearing station and the metal fastener forming station.
Figure 5:
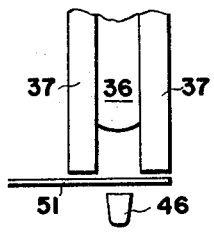
Figure 1:
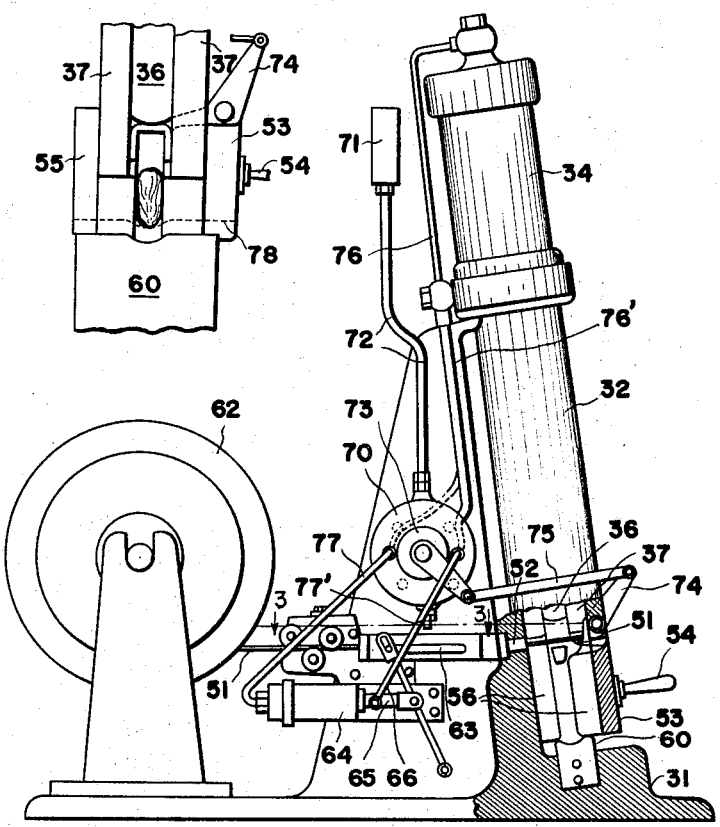

Referring more particularly to the drawings, the preferred embodiments of this invention will now be described; however, this description will be understood to be illustrative of the invention and not as limiting it to the particular constructions shown and described. There is provided a base 31 from which a body 32 is extended upwards integrally therewith. It is preferred that the body 32 is slanted somewhat rearwards for facilitating operations, as shown in FIG. 1. A square member 33 is arranged inside and substantially vertically slidably engaged with the body 32, as shown in FIG. 2. A first cylinder 34 is fixed to and arranged on the body 32. A piston (not shown) is adapted to reciprocate up and down inside the first cylinder 34. A piston (not shown) rod 35 is extended downwards from the piston and the lowermost end of the piston rod 35 is connected with the top of the square member 33 so as to drive the latter near vertically by the piston of the first cylinder 34. A slidable die 36 is connected with the square member 33 so as to slide the former substantially vertically inside the body 32 by the action of the first cylinder 34 through the square member 33. A shearing member 37 having two legs is adapted to slide substantially vertically on the slidable die 36 and also on the body 32. A shoulder 38 formed in the slidable die 36 is adapted to engage with a jaw 39 formed in the shearing member 37 so that the latter may be supported by the former as shown in FIG. 2. A spring-loaded pusher 40 is rocked about a pivot 41 horizontally protruded on the slidable die 36 and is adapted to push the top of the shearing member 37 downwards so that, when the shearing member 37 is restrained from lowering, the slidable die 36 may be still lowered as shown in FIG. 2.

There is a metal wire supplying means behind the body 32 as shown in FIG. 1, whence a wire 51 of a metal such as aluminum for forming fastener is supplied under the shearing member 37 through a perforation 52 intermittently at a predetermined length at a time, being unwound by the metal wire supplying means as described hereinafter. The perforation 52 is formed through the back wall of the body 32 and the inner end thereof is adapted to cooperate with one of the two legs of the shearing member 37 for cutting off a length of the metal wire 51 into a fastener blank 50 as shown in FIGS. 1, 2, 3, 4 and 5.

Figure 6:
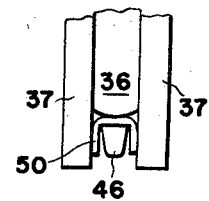

A lever 44 is pivoted on the body on the body 32 so as to be swingable laterally and has a following roller 45 on the top end thereof and a forming core 46 on the bottom end thereof. The following roller 45 is adapted to engage with a vertical cam 47 provided on one side of the shearing member 37 under the action of a spring 48 so as to swing the lever 44 when the shearing member 37 is lowered relative to the body 32, resulting in that the forming core 46 is displaced laterally into and out of the lowering path of the slidable die 36. The cutting of the fastener blank 50 is done just above the forming core 46 and then the legs of the shearing member 37 are further lowered pushing down the both ends of the fastener blank 50 while the central part of the blank is supported and restrained from lowering by the forming core 46 so that the blank 50 is deformed into an inverted U-shaped fastener as shown in FIG. 6. Although the slidable die 36 is lowered together with the shearing member 37, it is merely placed on the central part of the fastener blank 50 when it is deformed into the inverted U-shaped fastener, because the slidable die 36 is lowered with delay between and being retired from the two legs of the shearing member 37. After the forming core 46 has been retired into the righthand position in FIG. 2, the shearing member 37 is further lowered holding the inverted U-shaped fastener 50 between the two legs thereof so as to bring the fastener 50 into a bag fastening station.

Figure 7:
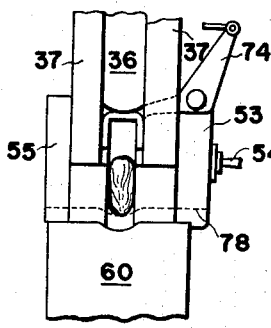

There is a space of the bag fastening station under the slidable die 36, where the bag fastening operation is done. A forcing member 53 is arranged in front of the space and hinged on and suspended from the bottom of the body 32 so as to be swingable to and fro. A handle 54 is protruded frontwards from the forcing member 53 to handle it as shown in FIGS. 1, 2, 3, and 7. By pushing the handle 54 rearwards, not only the forcing member 53 but also other parts are actuated in such a manner as described in detail hereinafter. A guide 55 is provided on the base 31 opposite to the rear wall of the forcing member 53. A guiding groove 56 is provided on the front wall of the guide 55 and another guiding groove 56 is formed on the rear wall of the forcing member 53, so as to guide the shearing member 37 when it is further lowered as shown in FIG. 7.

Figure 3:
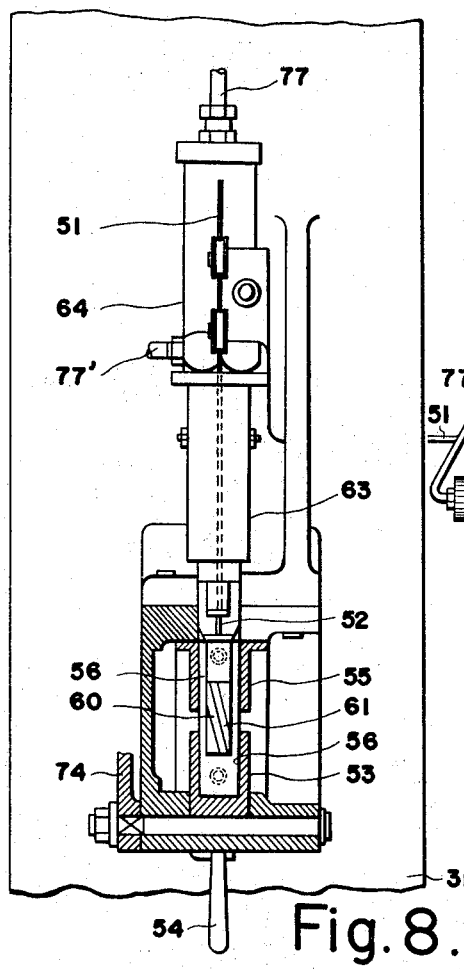
FIG. 3 is an enlarged sectional plan view thereof taken along the line 3—3 in FIG. 1.
Figure 8:
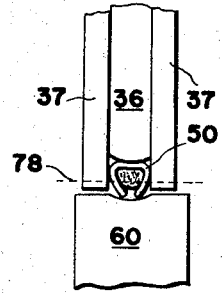
Figure 9:
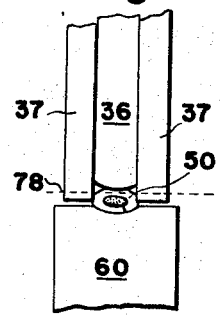

There is a fixed anvil 60 detachably secured on the base 31 and arranged just under the slidable die 36, which has a segmentally concave top surface provided with two fragmental turns of a coiling groove 61 shaped as internal screw threads as shown in FIG. 3. When the legs of the shearing member 37 arrive at the fixed anvil 60, the lowering motion thereof is ended but the slidable die 36 is further lowered relatively to the stopped shearing member 37 towards the fixed anvil 60 by the action of the first cylinder 34 so as to push the fastener 50 downwards out of the space between the two legs of the shearing member 37. By lowering the inverted U-shaped fastener 50 downwards, a neck of a gathered bag positioned in the space above the fixed anvil 60 is inserted between the two legs of the fastener 50. Continued movement of the slidable die 36 towards the fixed anvil 60 bends the ends of the fastener 50 around the neck of the bag cooperating with the two legs of the shearing member 37 and the spiral grooves on the top surface of the fixed anvil 60 so as to encircle the neck with overlapping ends of the fastener 50 as illustrated in FIGS. 7, 8, and 9 successively. Reference numeral 78 indicates a spring-loaded buffer means which resists the lowering of the slidable die 36 to an extent and then is lowered down to the top of the fixed anvil 60. By virtue of this means, the legs of the fastener 50 are smoothly inserted under the gathered neck of the bag so as not to damage the latter.

There is a rotatable drum 62 mounted on a shaft journalled by a stand provided on the base 31 and behind the body 32, from which the fastener stock 51 is supplied in continuous wire form into the metal wire shearing station through the perforation 52 as shown in FIG. 1. In order to intermittently and successively supply the metal wire 51 into the perforation 52, a metal wire supplying means is provide, which comprises a ratchet means 63 provided on the base 31 and just behind the perforation 52. The metal wire 51 inserted into the tubular ratchet means 63 frontwards is clamped by a pair of clamping members arranged therein so as to convey it intermittently by a predetermined length corresponding to the length of the fastener blank 50 towards the perforation 52 in accordance with the frontward stroke of the clamping members. The metal wire 51 is, however, left to stay in the advanced position by disengaging from the pair of clamping members during the latter is retracted to the original position. The clamping members provided in the ratchet means 63 are driven by a piston provided in a second cylinder 64 having a piston rod 65 connected with the clamping members by a link 66.

Figure 4:
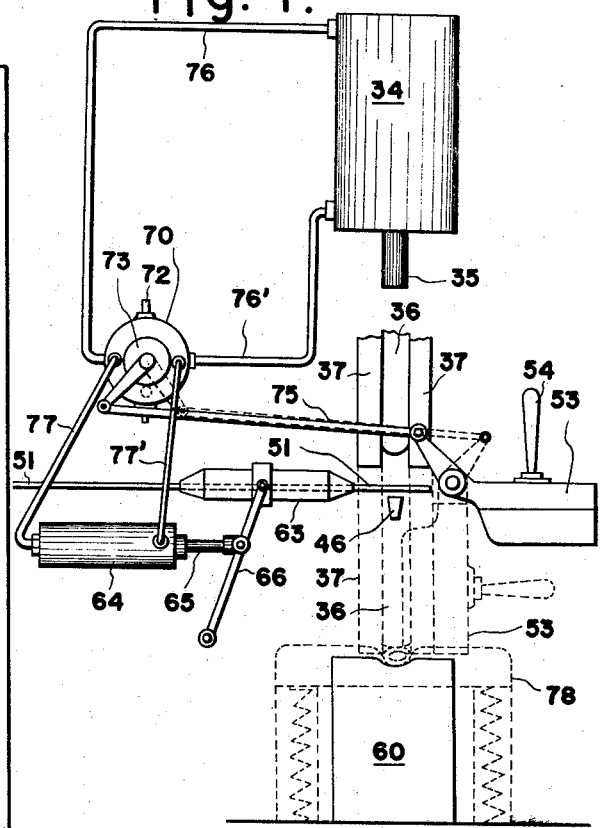
FIG. 4 is a diagrammatic sketch thereof for explaining the operation.

There is a distributor 70 on the base 31 which serves to distribute a pressure fluid supplied from a suitable source 71 through a pipe 72 into the first cylinder 34 through a pipe 76 and the second cylinder 64 through a pipe 77. The distributor 70 comprises a transferably valvular member 73 which is linked with an arm 74 intermediate a link 75. The arm 74 is fixedly protruded from the swingable forcing member 53. By virtue of this construction, the distributor 70 is operated by the forcing member 53 in such a manner that, when the forcing member 53 is pushed rearwards towards the bag fastening station, the first cylinder 34 is fed with the pressure fluid while the pressure fluid in the second cylinder 64 is exhausted therefrom through a pipe 77′ and, when the forcing member 53 is pulled up frontwards, the pressure fluid in the first cylinder 34 is exhausted therefrom through a pipe 76′ and the second cylinder 64 is fed with the pressure fluid. In such a manner as above, the first cylinder 34 is operated alternately with the second cylinder 64 as shown in FIGS. 1 and 4. Furthermore, there are provided a third cylinder 88, fourth cylinder 101, and sixth cylinder 157 which will be explained in detail hereinafter. It is, however, to be understood that they may be controlled by a single distributor in the similar manner with the above.

There is a bag neck gathering means at the side of the fastening station as shown in FIG. 10. The bag neck gathering means comprises two gathering gears 81 and 82 and is positioned just on the right of the fastening station and on a working deck 84 placed on the base 31. The gathering gear 81 is freely rotatably mounted on a shaft 83 arranged laterally above the top surface of the working deck 84 and somewhat in front of the center of the fastening station. The shaft 83 is carried by a covering member 80 which also serves to cover the gathering gear 81 as shown in FIGS. 10, 11, and 12. Another gathering gear 82 is positioned just under the gathering gear 81 so as to be in mesh therewith in such a manner that the pitch circle of these gears is positioned slightly above the top surface of the working deck 84 and there is a clearance between the two gathering gears such that the neck of the bag may pass through the clearance without any damage so as to be gathered into a bellow-like form while the gathering 81 is driven by the gathering gear 82. The gathering gear 82 is secured on a shaft 85 rotatably journalled inside the working deck 84. A pinion 86 is also secured on the same shaft 85 which is in mesh with a rack 87 adapted to be slidable to and fro in a guide provided inside the working deck 84. A third cylinder 88 is provided to reciprocate the rack 87 which may be actuated relatively to or independently of the first cylinder 34 and the second cylinder 64, although also to be fed with a pressure fluid. A pushing member 89 is also secured on the shaft 85 between the gathering gear 82 and the pinion 86 for pushing the neck of the bag being gathered from behind it into a slot 90 formed by a holding member 91 fixed on the working deck 84.

There is provided a bag neck twisting means just on the left-hand side of the fastening station and on the working deck 84 as shown in FIG. 10. A fourth cylinder 101 is arranged laterally on the working deck 84, the axis of the fourth cylinder 101 being arranged in parallel with the axis of the shaft 85 of the above-stated bag neck gathering means. A specially shaped outer piston 102 is adapted to engage with the fourth cylinder 101, and has an axial cylindrical cavity or bore 103 having an open left end so as to form a fifth cylinder integral with the fourth cylinder 101 as shown in FIGS. 13 and 14. A thick sleeve 104 is protruded from the outer piston 102 and extended out of the fourth cylinder 101 towards the fastening station as the piston rod of the outer piston 102. An inner piston 105 is adapted to engage with the cavity 103 so as to be slidable therein and provided with an inner piston rod 106 extending inside the thick sleeve 104. By virtue of the construction as above, it is possible to reciprocate the outer piston 102 inside the fourth cylinder 101 and the inner piston 105 inside the cylindrical cavity or the fifth cylinder 103 either individually or simultaneously as shown in FIGS. 13 and 14. A pressure fluid supplied into the fourth cylinder 101 at the leftmost end thereof through a pipe 107 (FIG. 10) and a spring-loaded adjusting valve 115 pushes the outer piston 102 and also the inner piston 105 rightwards at the same time. In order to move the outer piston 102 leftwards, a pressure fluid passage 108 is provided through the rightmost wall of the fourth cylinder 101 and, in order to move the inner piston 105 leftwards, the pressure fluid is further taken into the rightmost inside of the cavity 103 from the inside of the fourth cylinder 101 through passages 109 provided through the thick sleeve 104.

There is provided a pair of holding jaws 110 at the extremity of the thick sleeve 104, which are pivoted on forked ends of the thick sleeve 104 by means of a pin 111 fixed therethrough. The inner ends of the holding jaws 110 are connected with the outer or rightmost end of the inner piston rod 106 by means of a pair of toggle links 112. By virtue of this construction, it is possible to open the jaws 110 by pushing the inner piston 105. Knurled meeting faces may be provided at the outer ends of the jaws 110. It is not necessary to form the cavity 103 and the inner piston 105 as well as the inner piston rod 106 round in section, but it is necessary to form the fourth cylinder 101, the outer piston 102, and the thick sleeve 104 round in section so as to turn the outer piston 102 and the thick sleeve 104 in the fourth cylinder 101 and the bush-like member 118 extended from the fourth cylinder 101. There is formed a spiral groove 113 on the cylindrical outer surface of the thick sleeve 104. A stud 114 is provided through the wall of the bush-like member 118 and extended radially inwards so as to engage with the spiral groove 113 of the thick sleeve 104. By virtue of this engagement, when the thick sleeve 104 is slid with respect to the fourth cylinder 101, the former is simultaneously rotated with respect to the latter, so that the jaws 110 grasping a neck of a bag ise rotated on the axis of the fourth cylinder 101 while the jaws 110 are retracted towards the cylinder.

It is possible to control the sequence of operations of the four cylinders automatically. The order may be the third, fourth, second, and first. It is necessary that the operation of the third cylinder 88 be prior to that of the fourth cylinder 101 and the operation of the second cylinder 64 be prior to that of the first cylinder 34, but the operations of the third and fourth cylinders may be simultaneous with the operation of the second cylinder. The operative sequence of the second and first cylinders is controlled by means of the distributor 60. Similarly the operative sequence of the third and fourth cylinders may be controlled by a second distributing means (not shown), and further a single distributing means may be substituted for such two distributors.

In operation, the rotatable drum 62 is loaded with metal wire 51 for forming fasteners 50 and the unwound end of the metal wire 51 is inserted into the ratchet means 63. The pressure fluid source 71 is energized. A bag is put on the working deck 84 open end left in such a manner that the open end is positioned flat in front of the covering member 80, the extremity of the open end being placed so as to reach the holding jaws 110 of the twisting means. The third cylinder 88 is actuated by a suitable means such as a button or a handle. Then by advancing the flat neck of the bag slightly rearwards, it is engaged with the rotating gathering gears 81 and 82 so that the neck is gathered into a bellow-like state and conveyed to the slot 90 being pushed by the pushing member 89. Next the fourth cylinder 101 is actuated so that the gathered open end of the bag is pinched by the holding jaws 110 of the twisting means and pulled and twisted for about a half turn by the twisting means. Meantime, the second cylinder 64 is actuated so as to provide a fastener blank 50 and then the fastener blank 50 is applied to the gathered and twisted neck of the bag by a single manual rocking operation of the handle 54. After the fastening operation has been ended, the fourth cylinder 101 is reversed so as to release the sealed neck from the holding jaws 110. Then the sealed bag is removed to the right.

Reference is now made to FIGS. 15, 16, and 17, which show a modification, in which the first cylinder 134 is arranged horizontally. The horizontally arranged first cylinder is located inside the upper rear part of a housing or frame plate 125 which is secured to the base 131. The piston 135 of the first cylinder 134 adapted to reciprocate horizontally therein is extended frontwards. A cam 126 is formed by the front extremity and intermediate part of the extended piston 135 integrally therewith. There are provided rollers 127 between the cam 126 and the housing 125 to facilitate the reciprocation of the cam 126. It has a face 128 at the extremity thereof, which inclines to the horizontal direction of the reciprocation of the cam 126 at an angle of about 45°. The intermediate part of the cam is formed into a blunter face 129 of about 10° to the horizontal direction for continuing the steep face 128 to the horizontal direction. A roller 140 is rotatably mounted intermediate a roller bearing on a pin 141 provided on the square member 133 so as to engage with the faces 128 and 129 of the cam 126. By virtue of this construction, the horizontal reciprocation of the cam 126 is transmitted to the square member 133 so as to move the latter vertically. A coil spring 142 is compressed between a jaw 143 of the square member 133 and a shoulder 144 of the base 131 so as to restore the square member in its upper position when the cam 126 is restored towards the first cylinder 134. By virtue of the above construction, the square member 133 is lowered in such a manner that, while the shearing member and the slidable die pass the metal wire shearing station and the metal fastener forming station at a rather high speed, they move slowly but ready for heavy duty work at the fastener applying station.

The pressure fluid distributing means and the metal wire supplying means are substantially the same with the preceding embodiment but somewhat differently arranged. Particularly, the metal wire supplying means is operated neither pneumatically nor hydraulically but mechanically.

In this modification, the bag neck gathering and twisting operations are manual. To facilitate such manual operations, a guide comprising brackets 145 is provided on the right and/or left walls of the frame plate 125. The bracket 145 comprises a slot 146 which serves to keep the contents of a filled bag out of the slot 146 during fastening.

FIG. 18 illustrates still another embodiment which is similar to the embodiment shown in FIGS. 15, 16 and 17 with minor changes.

Reference is now made to FIGS. 19, 20, and 21, which show further another embodiment of this invention which contemplates the provision of a novel bag evacuation means built in the bag sealing machine in accordance with this invention. In general, it is frequently required to remove air from a package of foodstuffs placed in a bag of flexible material before the neck of the bag is sealed at the bag fastening station described hereinbefore. The bag evacuation means is located on the left hand side of the bag fastening station as shown in FIG. 19. A sixth cylinder 147 is fixed in a hole provided in the working deck 84 by putting its shoulder flange 148 thereon. An upstanding pipe 149 protruded from a central boss of a top cover 150 of the sixth cylinder 147 along the vertical axis thereof and communicated with the inside thereof carries a connecting member 151 thereon. A nozzle 152 communicating with the upstanding pipe 149 inside the connecting member 151 is extended horizontally therefrom towards the bag fastening station. A rotatable sleeve 153 is mounted concentrically on the extremity of the nozzle 152 and provided with a net 165 across the extreme end thereof and an integral eccentric flange 154 on the innermost end thereof. When a bag is placed in the fastening station, the extremity of the nozzle 152 may be inserted into the open end of the bag. A following rod 155 is arranged vertically slidably passing through the working deck 84 and the top thereof is adapted to engage with the face of the eccentric flange 154 so that, when the rotatable sleeve 153 is rotated manually the following rod 155 is pushed down. The lowermost end of the following rod 155 is linked with a valve 156 which controls supply of pressured fluid from the source 71 to a seventh cylinder 157 through a pipe 158. The seventh cylinder 157 is secured to and positioned just under the sixth cylinder 147 coaxially therewith so that a piston 159 of the sixth cylinder 147 and a piston 160 of the seventh cylinder 157 are adapted to be slidable vertically being connected with each other by means of a common piston rod 161 as shown in FIGS. 20 and 21. The pipe 158 leads the pressure fluid into the seventh cylinder 157 at the top part thereof so as to push down the piston 160. By virtue of this operation, the piston 159 is also pulled down inside the sixth cylinder 147 simultaneously with the lowering of the piston 160 so that the interior of the sixth cylinder 147 is evacuated and suction is provided through the upstanding pipe 149, the connecting member 151, and the nozzle 152 for evacuating the bag engaging with the rotatable sleeve 153 and being grasped together therewith manually. A check valve 162 is provided in the upstanding pipe 149 so as to check the counterflow of air into the bag. Another check valve 163 is provided in an exhaust pipe 164 for the sixth cylinder 147 so as to check the counterflow of air into the sixth cylinder 147. In order to restore the two pistons 159 and 160 to the upper position, it is possible to supply the lower space under the piston 160 inside the seventh cylinder 157 with the pressure fluid through a suitable pipe. Alternatively, it is also possible to provide a spring which serves for the restoration. It would be unnecessary to explain these parts in detail. Reference numeral 166 indicates a tank for the exhausted air.

In case the above bag evacuation means is provided, the neck twisting means becomes unnecessary, because the neck of the bag is duly twisted together with the rotatable sleeve 153 manually. FIG. 19 shows a liftable working deck 184, of which a part may be lifted and lowered in accordance with variation in size of filled bags. Such a construction is preferred in case not only the bag evacuation means is provided but also the neck gathering means and/or the neck twisting means are provided as the preceding embodiments.

While particular embodiments of the invention have been illustrated and described, further modifications thereof will readily occur to those skilled in the art. It should be understood therefore that the invention is not limited to the particular arrangements disclosed but that the appended claims are intended to cover all modifications which do not depart from the true spirit and scope of the invention.

I claim:

1. A bag sealing machine comprising a metal wire supplying means, a metal fastener forming means, and a metal fastener applying means, said metal wire supplying means supplying a length of metal wire into a metal wire shearing station through a perforation, said metal fastener forming means comprising a body, a shearing member having two legs, a slidable die positioned between two legs of said shearing member, and a forming core, said shearing member being slidable on said body, said slidable die being slidable on said shearing member, said forming core being swingable on said body, said perforation being provided through a wall of the body with which one of the two legs of said shearing member is adapted to cooperate, said metal wire being cut off into a length for a fastener blank by the lowering action of the one of the two legs cooperating with the inner end of said perforation, said length of the metal wire for a fastener blank being deformed into an inverted U-shaped fastener in a metal fastener forming station by the lowering action of said two legs of said shearing member cooperating with said forming core, said forming core remaining between said two legs and under said length of metal wire and being retracted just after said inverted U-shaped fastener has been formed, said slidable die following said two legs of the shearing member after said forming core has been retracted, said metal fastener applying means comprising said shearing member, said slidable die, a fixed anvil positioned just under said slidable die, a swingable forcing member, and guides, said shearing member holding said inverted U-shaped fastener at a bag fastening station, said slidable die following said two legs of the shearing member in delayed relation and being movable separately after said legs of the shearing member have arrived at said fixed anvil, said forcing member being adapted to place a gathered neck of said bag on said fixed anvil, said guides being adapted to guide said legs of the shearing member in said bag fastening station, and said inverted U-shaped fastener being applied on said neck by the lowering action of said slidable die and further deformed into a horizontally somewhat elliptic coil having more than one turn overlapping side by side on the down side of said neck around said neck by the lowering action of said slidable die cooperating with said legs of the shearing member and said fixed anvil.

2. In a bag sealing machine as claimed in claim 1, means for transferring said forming core into said metal fastener forming station and out thereof, comprising means holding said forming core swingable on said body, an elastic means tending to retract said forming core from said fastener forming station, and said shearing member having a surface engaged by said forming core, said surface being shaped discontinuously so as to push said forming core into said fastener forming station.

3. In a bag sealing machine as claimed in claim 1, a spring-loaded buffer means arranged aside said fixed anvil, on which said neck of the bag is pushed prior to be brought in contact with said fixed anvil.

4. In a bag sealing machine as claimed in claim 1, pressure fluid means, a cam, a following roller engaging said cam, said cam being displaceable in a direction other than that of said lowering of said shearing member and said slidable die by the action of said pressure fluid means and against the action of a spring, said following roller being mounted on said shearing member and adapted to be displaced by said cam, being kept in contact therewith, so as to lower said shearing member, and said cam having at least two faces of a steep face and a blunter face so that, under a uniform displacement of said cam, said shearing member is lowered at a high speed during the early stage of one cycle of operation and at a slow speed but with a stronger force during the neck fastening stage where said inverted U-shaped fastener is in contact with said fixed anvil.

5. In a bag sealing machine as claimed in claim 1, fluid pressure means, means for moving said slidable die and said shearing member, driven by the action of said fluid pressure means and actuated by the motion of said manually operable forcing member for pushing said neck of the bag into said neck fastening station.

6. In a bag sealing machine as claimed in claim 1, fluid pressure means, said metal wire supplying means being driven by the fluid pressure means and actuated by displacing said forcing member into a position where said neck fastening station is released whereby said metal wire is supplied into and across said metal fastener forming station by a predetermined length at a time.

7. A bag sealing machine as claimed in claim 4, in which said lowering of said shearing member and said slidable die by the action of said pressure fluid means is actuated by the motion of said manually operable forcing member for pushing said neck of the bag into said neck fastening station.

8. In a bag sealing machine as claimed in claim 1, a mechanism which supplies said metal wire into and across said metal fastener forming station by a predetermined length at a time by the motion of displacing said forcing member into a position where said neck fastening station is released whereby said mechanism is driven mechanically.

9. A bag sealing machine as claimed in claim 4, in which said metal wire is supplied into and across said metal fastener forming station by a predetermined length at a time by the motion of displacing said forcing member into a position where said neck fastening station is released, said metal wire supplying means being connected with said forcing member mechanically.

10. In a bag sealing machine as claimed in claim 1, a bag neck gathering means comprising two gears, a pushing member, a pinion, and a rack, one of said two gears being in mesh with the other of said two gears in up and down relation so as to drive said one by the other while a clearance between said two gears is adapted to deform and gather a flat neck of said bag into a bellow-like shape without any damage by passing said neck through said clearance, said pushing member being adapted to push said neck being gathered towards said neck fastening station, and at least one of said two gears and said pushing member being driven by said rack intermediate said pinion.

11. In a bag sealing machine as claimed in claim 1, a bag neck twisting means comprising a pair of holding jaws accessible to said neck fastening station, an axially slidable piston rod driven by pressured fluid in a cylinder, another axially slidable member having a common pivot for swinging said pair of holding jaws and a pin in engagement with a spiral groove formed on said piston rod, and driven by said cylinder individually from said piston rod, and a toggle mechanism for operating said holding jaws by said axial motion of said piston rod.

No references cited.

TRAVIS S. McGEHEE, *Primary Examiner.*